United States Patent [19]
Hillyer

[11] 3,943,796
[45] Mar. 16, 1976

[54] GEAR CHANGE MECHANISM

[75] Inventor: Anthony William Hillyer, Loughborough, England

[73] Assignee: Raleigh Industries Limited, Nottingham, England

[22] Filed: May 22, 1974

[21] Appl. No.: 472,372

[30] Foreign Application Priority Data
May 22, 1973 United Kingdom............... 24501/73

[52] U.S. Cl. ............................ 74/577 S; 74/577 SF
[51] Int. Cl.² ......................................... F16H 29/00
[58] Field of Search ......... 74/577 SF, 577 S, 577 R, 74/576

[56] References Cited
UNITED STATES PATENTS

| | | |
|---|---|---|
| 2,216,482 | 1/1940 | Wright............................... 74/577 S |
| 2,717,565 | 9/1955 | Baehr............................... 74/577 R X |
| 3,225,874 | 12/1965 | Woolley............................. 74/576 X |
| 3,862,580 | 1/1975 | Pulles ............................... 74/577 S |

Primary Examiner—Samuel Scott
Assistant Examiner—F. D. Shoemaker
Attorney, Agent, or Firm—Lackenbach, Lilling & Siegel

[57] ABSTRACT

A pawl member is formed as an integral structure from a synthetic plastics material, the said member having a pawl tooth extending outwardly from a body part and including a tail for co-operation with an abutment to load the tooth into or out of engagement with a co-operating ratchet formation the member being so designed having regard to its intended context as to operate within the strain limit of the material concerned during normal usage.

6 Claims, 6 Drawing Figures

GEAR CHANGE MECHANISM

The invention concerns pawl members and has more particular reference to pawl members which are intended to be resiliently urged towards or away from a co-operating ratchet formation.

There are many instances wherein a pawl is resiliently urged in a given direction into or out of engagement with a co-operating ratchet formation, the loading usually being derived from a spring or the like engaged with the pawl and operating against a suitable seating. Various examples are to be found, for instance, in epicyclic change-speed gear hubs for bicycles, where pawls are provided for transmitting a drive between relatively rotatable elements, the spring loading applied in this context generally being light. Another example is to be found in the trigger control mechanism for such an epicyclic change-speed gear hub, the pawl, in this case, being subjected to relatively heavy spring loading and co-operating with a selected one of a plurality of detent formations on a ratchet plate and wire guide for locating such structure angularly about a pivot point thus longitudinally to adjust a control wire.

Resiliently loaded pawls of this general kind have been used for many years with success, despite the inconvenience and cost of assembly and the possibility of malfunctioning due to spring failure or displacement.

The primary object of the present invention is to provide an alternative to the pawl/spring combination as hitherto used which will be equally effective in operation and which will avoid the risk, present with conventional combinations, of malfunction due to spring displacement.

According to the present invention, a pawl member comprises a pawl body including mounting means adapted for co-operation with a suitable seating for support relative to a ratchet formation for co-operation therewith, at least one pawl tooth on or extending outwardly from the body, and a tail for loading the pawl tooth into or out of engagement with the said ratchet formation, the said pawl member being moulded as an integral structure from a synthetic plastics material or appropriate elasticity characteristics.

By "appropriate elasticity characteristics" is meant a characteristic which will provide for a ready resilient flexibility in an element of a relatively small cross-sectional dimension and a substantial rigidity in an element of a relatively large cross-sectional dimension.

In practice, the "cantilever type" springs which comprise the pawl members are designed to operate within the "strain-limit" of the materials involved, thus to ensure substantially complete elastic recovery of the pawl member after deformation, it being important that the spring is not constantly under load if satisfactory spring performance is to be achieved.

The invention also includes structures embodying a pawl member as aforesaid.

The invention will now be described further, by way of example only, with reference to the accompanying drawings illustrating several embodiments thereof and in which.

Figure 1:
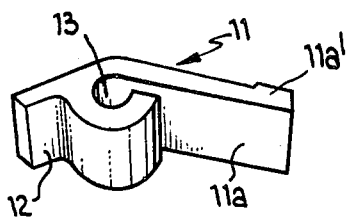
FIG. 1 shows in perspective view, a first embodiment as used in the context of a trigger control for an epicyclic change-speed gear hub.

Referring now to the drawing, and in particular to FIG. 1 thereof, a pawl member comprises a body part 11 having a tail 12 formed integrally therewith, the body part having mounting means defined by a through bore 13 therein for engagement with a mounting pin, not shown, to locate the pawl member in a requisite position relative to a ratchet formation, not shown. The body part includes an elongate pawl tooth 11a engageable with the ratchet formation, the remote end 11a' of such tooth 11a being of thicker cross-section than the adjacent parts thereof.

Figure 4:
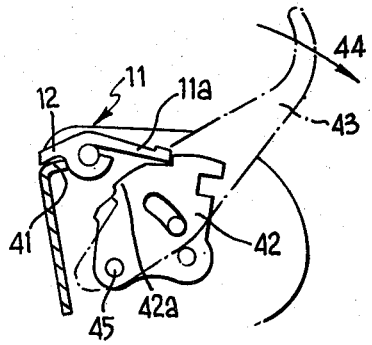

In use, see now FIG. 4 in which the pawl member is shown in the context of a trigger control for the cable of a bicycle change-speed gear, the tail 12 engages an abutment 41 to preclude rotation of the pawl member in an anti-clockwise direction, as seen in the drawing, and to load the pawl tooth into engagement with a co-operating ratchet tooth, whilst the dimension of the pawl tooth 11a both in the longitudinal and transverse directions thereof, are such, having regard to the material from which the pawl member is produced, that the pawl tooth 11a will flex to permit the pawl member to ride over a ratchet tooth 42a on movement of the ratchet plate 42 consequent upon displacement of the trigger 43 in the direction of arrow 44 about pivot axis 45 but will be of adequate rigidity to restrain normal motion of the ratchet plate in the reverse direction. Displacement of the ratchet plate to permit adjustment in the reverse direction is effected in conventional manner.

Figure 2:
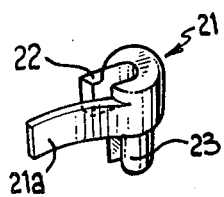
FIG. 2 is a corresponding view of a second embodiment as used in the context of an epicyclic change speed gear hub.
Figure 5:
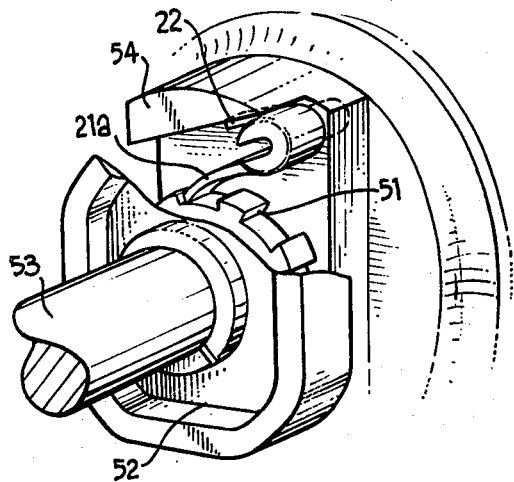
FIGS. 4, 5 and 6 show, diagrammatically, typical applications of the pawl members of FIGS. 1, 2 and 3 respectively.

The embodiment shown in FIG. 2 is of a somewhat similar kind to that shown in FIG. 1 in that the pawl body part 21 has a tail 22 formed integrally with and extending therefrom, which tail 22 is intended to engage an abutment to prevent rotation of the pawl member about a fixed axis, and to load the pawl member towards an operative position. The pawl member has a cylindrical lug 23 for engagement with a suitable seating (not shown) to mount the member, the axis of such lug constituting the fixed axis aforesaid. As with the embodiment of FIG. 1, the body part of the pawl member shown in FIG. 2 likewise includes a pawl tooth 21a of such dimensions, having regard to the nature of the material from which the pawl member is fabricated, as to be flexible to permit the pawl member to over-ride a ratchet formation engaged therewith and moving relative thereto in a first direction, whilst normally preventing motion of the said formation in the reverse direction. A typical application of the pawl member of FIG. 2 is shown in FIG. 5, the pawl member being co-operable with ratchet teeth 51 on a control cam 52 rotatably mounted on a shaft 53, the structure being a part of an epicyclic change-speed gear hub for a bicycle. The tail 22 operates against an abutment 54 to hold the pawl member against rotation in the clock-wise direction and such tail serves resiliently to load the pawl tooth into engagement with the ratchet teeth.

Figure 3:
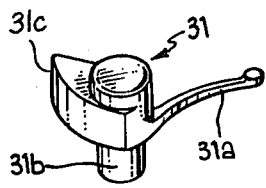
FIG. 3 is a perspective view of a third embodiment, again as used in the context of an epicyclic change speed gear hub.

A still further form of pawl member is illustrated in FIG. 3, such pawl member having a body part 31 formed with a tail 31a, a mounting lug 31b and a pawl tooth 31c, the member being of integrally moulded construction. In contra-distinction to the embodiments of FIGS. 1 and 2, the pawl tooth is substantially rigid, whilst the tail 31a is flexible and serves to engage a suitable abutment for urging the said body part out of engagement with a co-operating ratchet formation, the body part being cammed into such engagement by a means not shown.

Figure 6:
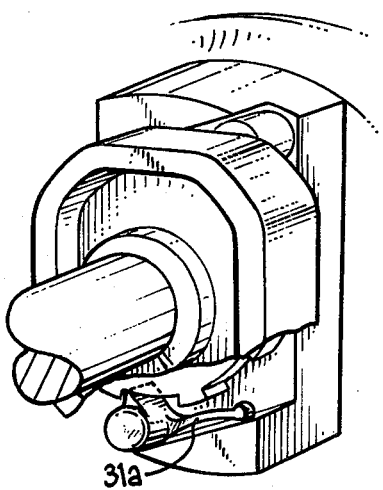

A typical application of the pawl member of FIG. 3 is shown in FIG. 6, the pawl member being embodied in the same structure as is illustrated in FIG. 5.

Whilst a range of possible synthetic plastics materials may well be available for use in producing the pawl member of the present invention, we prefer to use polyacetal or nylon 66, such materials having been found to possess adequate wear resistance and stability characteristics. Other possible materials are, for example, the polyphenylene sulphuderesins or carbon fibres, although economic considerations may well militate against their adoption.

Generally, the pawl member will be produced by injection moulding, although in some cases, for example, as with the embodiment of FIG. 1, the member can be cut from an extruded rod of appropriate transverse cross-section.

What we claim is:

1. A pawl member comprising a pawl body including mounting means adapted for co-operation with a suitable seating for support relative to a ratchet formation for co-operation therewith, at least one pawl tooth extending outwardly from the body and a tail portion extending outwardly from the body for loading the pawl tooth in a predetermined position relative to a co-operating ratchet formation, the said pawl member being moulded as an integral structure from a synthetic plastics material of appropriate elasticity characteristics.

2. A pawl member as claimed in claim 1 wherein the tail portion is of limited resilient flexibility for the two-fold purpose of co-operating with an abutment to limit rotation of the pawl member and of loading the pawl tooth as aforesaid.

3. A pawl member as claimed in claim 1 wherein each pawl tooth is resiliently flexible.

4. A pawl member as claimed in claim 1 wherein the mounting means comprises a lug extending from the body part and defining a pivot axis for the structure.

5. A pawl member as claimed in claim 1 moulded from polyacetal.

6. A pawl and ratchet mechanism including a pawl member comprising a pawl body including mounting means adapted for co-operation with a suitable seating for support relative to the ratchet formation for co-operation therewith, at least one pawl tooth extending outwardly from the body and a tail portion extending outwardly from the body for loading the pawl tooth in a predetermined position relative to the co-operating ratchet formation, the said pawl member being moulded as an integral structure from a synthetic plastics material of appropriate elasticity characteristics.

* * * * *